(12) United States Patent
Alissa et al.

(10) Patent No.: US 12,311,312 B2
(45) Date of Patent: *May 27, 2025

(54) CARBON CAPTURE SYSTEM

(71) Applicant: Microsoft Technology Licensing, LLC, Redmond, WA (US)

(72) Inventors: Husam Atallah Alissa, Redmond, WA (US); Mark Alan Monroe, Louisville, CO (US); Bharath Ramakrishnan, Bellevue, WA (US); Vaidehi Oruganti, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/472,686

(22) Filed: Sep. 22, 2023

(65) Prior Publication Data

US 2024/0009614 A1 Jan. 11, 2024

Related U.S. Application Data

(63) Continuation of application No. 17/565,263, filed on Dec. 29, 2021, now Pat. No. 11,801,470.

(51) Int. Cl.
*B01D 53/04* (2006.01)

(52) U.S. Cl.
CPC ..... *B01D 53/0438* (2013.01); *B01D 53/0446* (2013.01); *B01D 2257/504* (2013.01); *B01D 2259/4009* (2013.01); *B01D 2259/402* (2013.01)

(58) Field of Classification Search
CPC . B01D 53/04; B01D 53/0438; B01D 53/0446
See application file for complete search history.

(56) References Cited

U.S. PATENT DOCUMENTS 8,500,886 B2 * 8/2013 Okano ............... B01D 53/06
96/123

* cited by examiner

*Primary Examiner* — Sharon Pregler
(74) *Attorney, Agent, or Firm* — RAY QUINNEY & NEBEKER P.C.; Paul N. Taylor

(57) ABSTRACT

A carbon capture system includes two carbon capture plates. A first carbon capture plate collects carbon dioxide from a flow of ambient air. A second carbon capture plate releases carbon dioxide upon application of heat from a heat exchanger. The heat is exhaust heat from a data center. The first carbon capture plate and the second carbon capture plate are rotatable between the capture and release positions. The carbon capture system uses the waste heat from a data center to collect and store atmospheric carbon dioxide, thereby reducing the concentration of atmospheric carbon dioxide.

20 Claims, 16 Drawing Sheets

CARBON CAPTURE SYSTEM

CROSS-REFERENCE TO RELATED APPLICATIONS

This application is a continuation of U.S. patent application Ser. No. 17/565,263, filed Dec. 28, 2021, which is hereby incorporated by reference in its entirety.

BACKGROUND

Many processors produce waste heat during operation. If the temperature of a processor increases above a certain threshold, performance of the processor may degrade, and, in some situations, the heat may damage the processor. Cooling systems are implemented in computing devices to reduce the processor temperature. A data center is a location that includes many servers filled with heat-generating processors. A data center cooling system may include a working fluid that absorbs the processor heat. This heat is often dispersed into the atmosphere or other heat sink.

Carbon dioxide is a product of many chemical reactions, including the combustion of fossil fuels. Atmospheric carbon dioxide contributes to the greenhouse effect in the atmosphere. Carbon capture and storage systems collect and store carbon dioxide from the atmosphere or other sources. Such systems may include chemical absorption, chemical adsorption, density separators, any other separators, and combinations thereof. Many carbon capture and storage systems utilize one or more heat sources to collect, store, or release the carbon dioxide in a controlled setting.

BRIEF SUMMARY

In some embodiments, a carbon capture system includes a housing including an inlet and an outlet. A carbon capture module includes a support structure is located in the housing and includes a first plate support and a second plate support. The support structure is rotatable to move the first plate support and the second plate support between a capture position and a release position. The capture position is located between the inlet and the outlet. A hot fluid line is connected to a cooling system for a data center and provides hot fluid to the hot side of a heat exchanger. A cold fluid line is connected to the cold side of the heat exchanger and returns cold fluid to the cooling system.

In some embodiments, a method for carbon capture includes flowing ambient air from an inlet in a housing of a carbon capture system across a first carbon capture plate located in a capture position in the housing and an outlet of the housing. The first carbon capture plate absorbs carbon dioxide from the ambient air. A second carbon capture plate uses exhaust heat from a data center cooling system. The second carbon capture plate is located at a release position in the housing and releases carbon dioxide into a release chamber. Carbon dioxide is capture in the release chamber and the first carbon capture plate and the second carbon capture plate are rotated between the capture position and the release position.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 1-2 is a top view of the carbon capture system of FIG. 1-1;

FIG. 2 is a representation of a carbon capture system, according to at least one embodiment of the present disclosure;

DETAILED DESCRIPTION

This disclosure generally relates to devices, systems, and methods for carbon capture and storage. In particular, carbon dioxide from ambient air may be collected by a first carbon capture plate in a capture position. When the carbon capture plate is full, the panel may be moved into a release position. In the release position, a heat exchanger may apply heat to the carbon capture plate, causing the carbon dioxide to release. The released carbon dioxide may then be collected, stored, and/or used in other applications. In some embodiments, the carbon capture device includes two carbon capture plate. This allows one panel to be in the capture position and one to be in the release position. When the capture panel is full, the release panel is empty, or based on any other criterial, the positions of the panels may be switched, and the capture panel may begin to release the captured carbon dioxide.

In some embodiments, a heat source for the heat exchanger may be waste heat generated by computing devices. For example, a data center may include a plurality of computing devices, such as processors, memory, and so forth. Use of the computing devices may generate heat. The devices may be cooled using a cooling system. Some cooling systems blow air across the computing devices with one or more fans to collect the heat. Some cooling systems immerse the computing devices in a working fluid, and the working fluid may collect the heat and be transported away from the computing devices. In some situations, the liquid in which the computing device is submerged may change phase (e.g., boil) from the heat generated by the computing devices. The evaporated working fluid may be condensed in a condenser. In accordance with one or more embodiments of the present disclosure, the heat released during condensing may be collected by a liquid and used by the heat exchanger to provide the heat to release the carbon dioxide. In some embodiments, unevaporated, but still warm, working fluid may be used in the heat exchanger to release the carbon dioxide.

Using waste heat to release captured carbon dioxide may help to reduce the carbon footprint commercial operations. For example, using the waste heat of a computing device or a plurality of computing devices may help to reduce the carbon footprint of a data center. Indeed, this concept may contribute to the reduction in carbon dioxide concentrations in the atmosphere, both locally and on a global scale. For the purposes of this disclosure, and unless otherwise stated, the term "carbon" may refer to the chemical compound carbon dioxide ($CO_2$).

Figure 1:
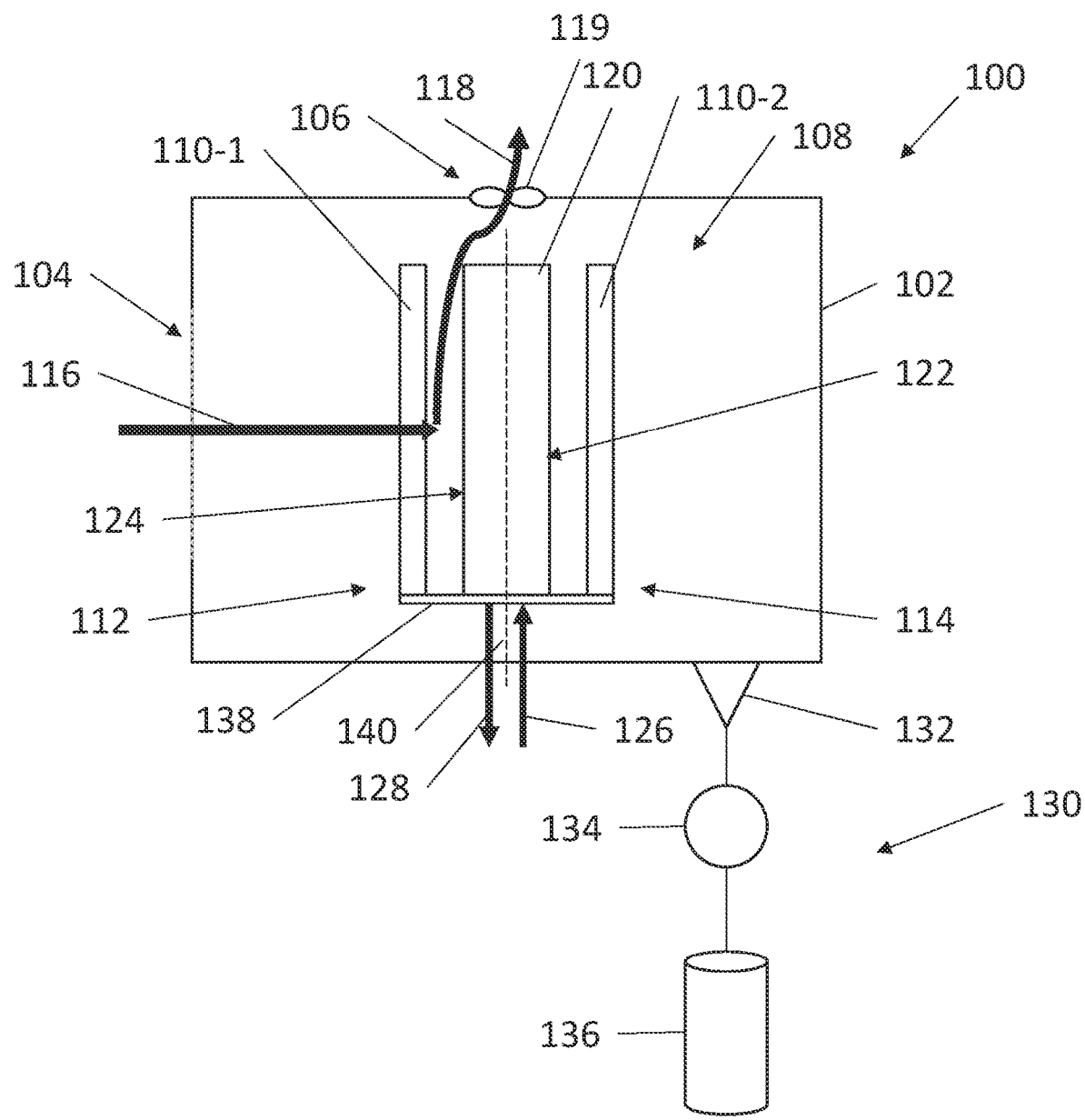
FIG. 1-1 is a representation of a side view of a carbon capture system, according to at least one embodiment of the present disclosure.

FIG. 1-1 is a representation of a carbon capture system 100, according to at least one embodiment of the present disclosure. The carbon capture system 100 includes a housing 102 having an inlet 104 and an outlet 106. A carbon capture module 108 is located within the housing 102. The carbon capture module 108 includes a first carbon capture plate 110-1 and a second carbon capture plate 110-2. In the embodiment shown, the first carbon capture plate 110-1 is located in a capture position 112 and the second carbon capture plate 110-2 is located in a release position 114.

The carbon capture plates (collectively 110) are formed from a carbon capture media that collects and releases carbon dioxide based on one or more factors. In some embodiments, the carbon capture plates 110 may be formed from a carbon capture media that captures carbon dioxide at a relatively low temperature (e.g., less than or equal to 35° C.) and releases carbon dioxide at a relatively high temperature (e.g., greater than or equal to 40° C.). By using a temperature-sensitive carbon capture media, an operator may control the capture and release of carbon dioxide. In some embodiments, the carbon capture media may include one or more of: activated carbon (AC), AC having 4% KOH, AC having EDA+EtOH, AC having 4% KOH+EDA+EtOH, NiO-ACs, 13X, 5A, 4A, WEG-592, APG-II, Na-Y, Na-X, NaKA, NaX-h, Na-X-c, Cs-X-h, Cs-X-c, MCM-41, MCM-41 (DEA), MCM-41 (50% PEI), PE-MCM-41, MCM-48m MWNT, Unmodified [$(Cu3(btc)_2$], MIL-101, MWCNT@MIL-101, MOF-2, MOF-177, Zr-MOFs, Ca—Al LDH, Ceria-based oxides doped with 5% gallium (III), or amine modified layered double hydroxides (LDHs).

A first flow 116 of intake air enters the housing 102 and passes over the first carbon capture plate 110-1 in the capture position 112. The intake air include a mixture of gasses, including a concentration of carbon dioxide. As the first flow 116 of intake air passes over the first carbon capture plate 110-1, the first carbon capture plate 110-1 captures at least a portion of the concentration of carbon dioxide. The carbon-depleted air is then exhausted out the exhaust 106 as a second flow 118 of exhaust air.

In the embodiment shown, an outlet fan 119 is located at the outlet 106. The outlet fan 119 may rotate to apply a negative pressure to the interior of the housing 102. This may help to draw the second flow 118 of exhaust air from the first carbon capture plate 110-1 out of the outlet 106.

The carbon capture module 108 includes a heat exchanger 120 having a warm side 122 and a cool side 124. The warm side 122 of the heat exchanger 120 is positioned proximate to the second carbon capture plate 110-2 in the release position 114. In some embodiments, the warm side 122 of the heat exchanger 120 may be in thermal communication (e.g., is thermally connected to) with the second carbon capture plate 110-2 in the release position 114. For example, the warm side 122 of the heat exchanger 120 may be in direct contact with the second carbon capture plate 110-2 in the release position 114. In some examples, the warm side 122 of the heat exchanger 120 may be in contact with a heat transmission media that is in contact with the second carbon capture plate 110-2 in the release position 114, such as a metal plate, a fluid, a gas, any other heat transmission media, and combinations thereof.

Heat for the heat exchanger 120 is supplied by a hot fluid line 126. The hot fluid line 126 is connected to the hot side 122 of the heat exchanger. As discussed in further detail herein, the hot fluid line 126 may originate at a heat source, such as a data center cooling system, including a liquid immersion cooling system. In some embodiments, the hot fluid line 126 may transport a liquid, such as water or another thermal liquid. In some embodiments, the hot fluid line 126 may transport a gas. In some embodiments, the hot fluid line 126 may include phase change heat transmission structure, such as a heat pipe, a vapor chamber, or other phase change heat transmission structure. Heat from the hot fluid line 126 is absorbed by the second carbon capture plate 110-2 in the release position 114, thereby cooling the fluid in the hot fluid line 126. The cooled fluid is then returned to the heat source using a cold fluid line connected to the cold side 124 of the heat exchanger 120.

In some embodiments, the hot side 122 of the heat exchanger 120 is heated with an auxiliary heater. For example, an electric heater, such as a resistance heater, may heat the heat exchanger 120. In some examples, a microwave-based heater may be used to deliver the heat directly to the panel.

The heat from the heat exchanger 120 causes the second carbon capture plate 110-2 in the release position 114 to warm up (e.g., increase in temperature). Increasing the temperature on the second carbon capture plate 110-2 releases captured carbon dioxide. The released carbon dioxide is then collected by a carbon collection system 130. The carbon collection system is position to collect the carbon dioxide released from the second carbon capture plate 110-2 in the release position 114. The carbon collection system 130 shown includes a collection pan 132, a compressor 134, and a carbon storage tank 136. The collection pan 132 collects the released carbon dioxide, which is then compressed by the compressor 134 and stored in the carbon storage tank 136. While the carbon collection system 130 shown describes compressed carbon dioxide storage, it should be understood that the released carbon dioxide may be stored in any other fashion, including as gaseous, solid, liquid, mixed with other chemicals, and so forth.

In some embodiments, the carbon collection system 130 includes a carbon dioxide separator. For example, the carbon dioxide separator may be a centrifugal scrubber that separates gasses based on density. In some examples, the carbon dioxide separator may include one or membranes that allow the passage of carbon dioxide but not other gasses. In some embodiments, the carbon collection system may include one or more scrubbers that help to prevent the loss of refrigerants from the cooling system.

The first carbon capture plate 110-1 and the second carbon capture plate 110-2 are supported by a support structure 138. The support structure 138 a first plate support into which the first carbon capture plate 110-1 is inserted and a second plate support in which the second carbon capture plate 110-2 is inserted. The support structure 138 is rotatable about a rotation axis 140. During operation of the carbon capture system 100, the support structure 138 is rotated. Because the carbon capture plates (collectively 110) are connected to the support structure 138, rotating the support structure rotates the carbon capture plates 110. In some embodiments, the carbon capture plates 110 switch positions based on the rotation of the support structure 138. For example, rotating the support structure 138 may cause the first carbon capture plate 110-1 to move from the capture position 112 to the release position 114, and cause the second carbon capture plate 110-1 to move from the release position 114 to the capture position 112. In this manner, the carbon dioxide capture at the capture position 112 may be released at the release position 114, and the depleted carbon capture plate 110 may collect additional carbon dioxide. In this manner, the carbon capture system 100 may continuously operate.

In accordance with at least one embodiment of the present disclosure, the support structure 138 is rotated based on one or more rotation criteria. For example, the support structure 138 may be rotated after a capture duration, such as 1 minute, 10 minutes, 30 minutes, 1 hour, 2 hours, 3 hours, 4 hours, 5 hours, 6 hours, 7 hours, 8 hours, 9 hours, 10 hours, or any duration between. In some examples, the support structure 138 may be rotated when the carbon capture plate 110 in the capture position 112 is saturated with carbon dioxide, or within a certain capture saturation percentage, such as 50%, 60%, 70%, 80%, 90%, 95%, 99%, or any value therebetween. In some examples, the support structure 138 may be rotated when the carbon capture plate 110 in the release position is released of carbon dioxide, or within a certain release saturation percentage, such as 50%, 40%, 30%, 20%, 10%, 5%, 1%, or any value therebetween.

In some embodiments, the first flow 116 of intake air may be ambient air. Ambient air may be environmental air, or the air located outside of the housing 102. In some embodiments, the first flow 116 of intake air may include exhaust from burning fossil fuels, such as a motor, a generator, a power plant, flare gas, any other exhaust, and combinations thereof. The source of the intake air may be related to the concentration of carbon dioxide. For example, environmental air in high pollution areas, such as a city or near a power plant, may have higher carbon dioxide concentrations than environmental air in highly vegetated areas, such as a forest or a swamp. In some examples, exhaust from burning fossil fuels may have a high concentration of carbon dioxide.

In some embodiments, the first flow 116 of intake air may have an intake temperature of less than 35° C. In some embodiments, the first flow 116 of intake air may have an intake temperature of between 0° C. and 35° C. In some embodiments, the first flow 116 of intake air may have an intake temperature of between 10° C. and 35° C. In some embodiments, the first flow 116 of intake air may have an intake temperature of between 20° C. and 35° C. In some embodiments, the first flow 116 of intake air may have an intake temperature that is the same as the ambient air temperature, and may change according to the time of day and/or seasonal weather patterns. The intake temperature may be based on the capture temperature of the carbon capture plates 110. For example, the carbon capture plates may capture carbon dioxide at temperatures of 35° C. or less. In this manner, an intake temperature of less than 35° C. may allow for more efficient capture of carbon dioxide by the carbon capture plate 110 in the capture position 112. In some embodiments, the intake temperature may be 25° C. In some embodiments, the intake temperature may be greater than 35° C.

In some embodiments, the hot fluid line 126 may have a hot fluid temperature of at least 45° C. For example, the hot fluid line 126 may have a hot fluid temperature of between 45° C. and 60° C. The hot fluid temperature may be based on the release temperature of the carbon capture plates 110. For example, the carbon capture plates may begin to release carbon dioxide at 45° C. In this manner, a hot fluid temperature of at least 45° C. may efficiently release the carbon dioxide from the carbon capture plate 110 by heating the hot side 122 of the heat exchanger 120 to at least 45° C. In some embodiments, the hot fluid temperature may be between 70° C. and 100° C.

In some embodiments, the cold fluid line 128 may have a cold fluid temperature of 40° C. or less. The cold fluid temperature may be based on the amount of heat that the carbon capture system 100 absorbs. In some embodiments, the cold fluid temperature may be the operating temperature of the cooling system. In some embodiments, the cold fluid line 128 may be further cooled before returning to the cooling system.

Figures 1, 2:
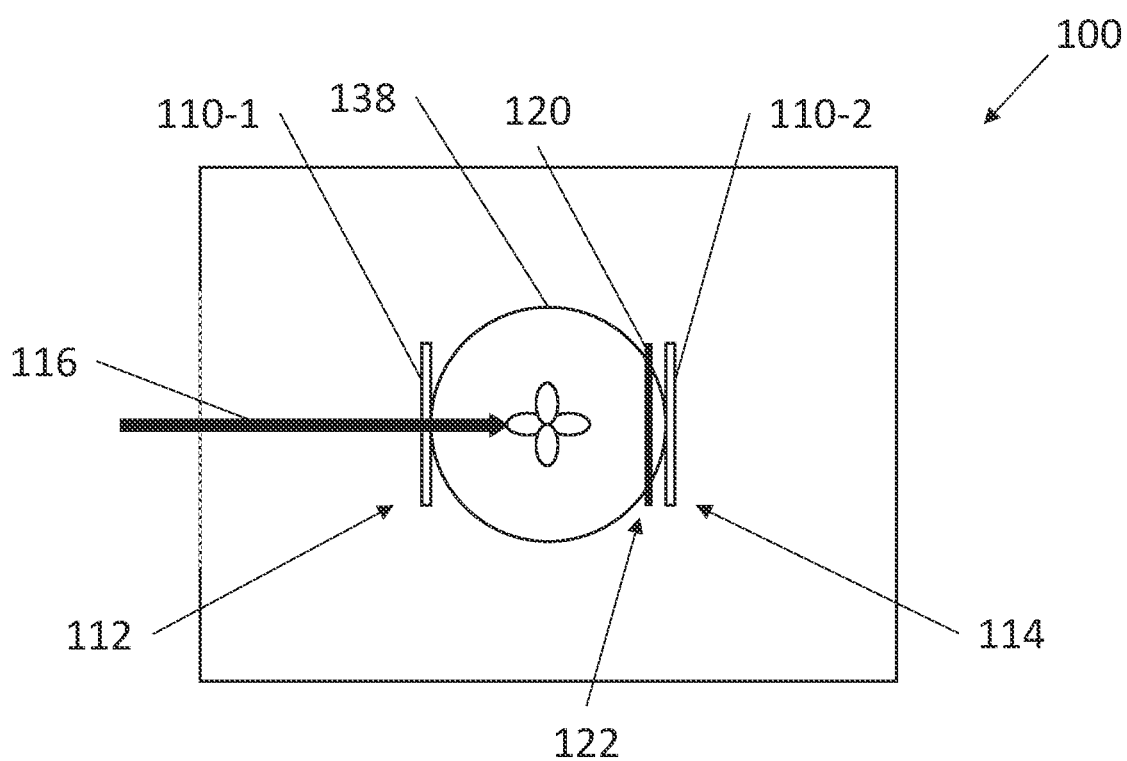
Figure 2:
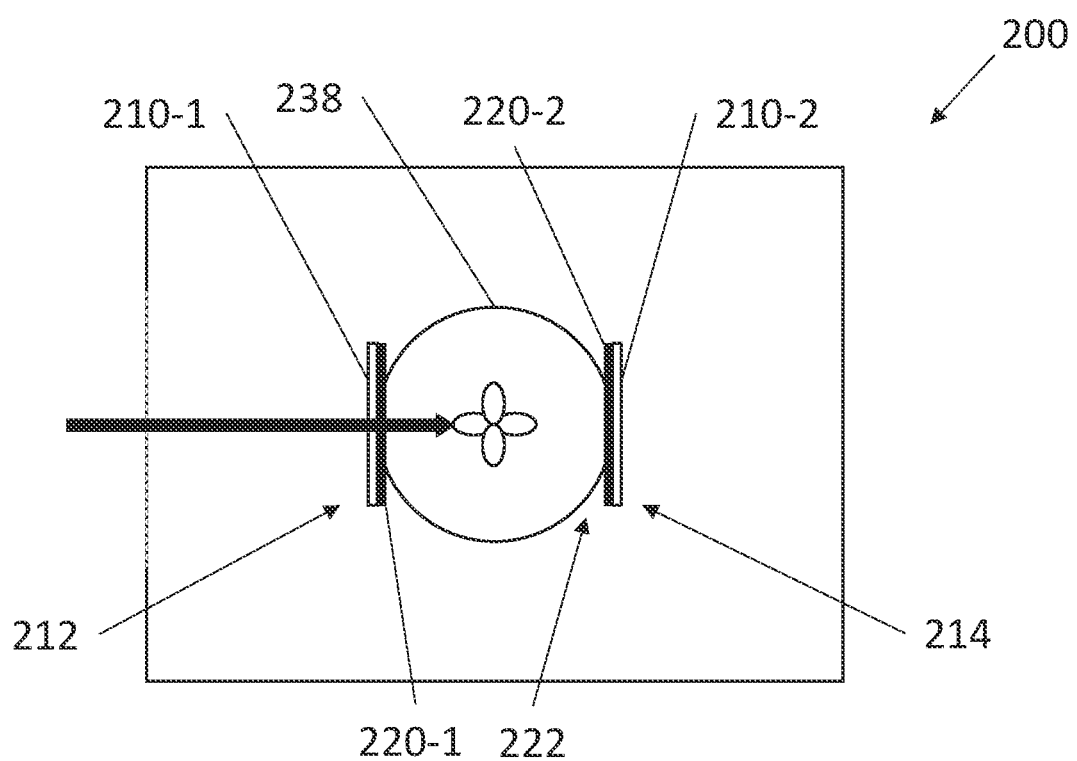

FIG. 1-2 is a top-down view of the carbon capture system 100 of FIG. 1-1. As may be seen, the support structure 138 supports the first carbon capture plate 110-1 in the capture position 112 and the second carbon capture plate 110-2 in the release position 114. The hot side 122 of the heat exchanger 120 is in thermal communication with the second carbon capture plate 110-2. The first flow 116 of intake air flows over the first carbon capture plate 110-1 in the capture position so that the first carbon capture plate 110-1 captures carbon dioxide in the intake air.

As discussed herein, the carbon capture plates 110 are movable between the capture position 112 and the release position 114 by rotating the support structure 138. When the support structure 138 rotates the first carbon capture plate 110-1 into the release position 114, the heat exchanger 120 may come into thermal communication with the first carbon capture plate 110-1. In some embodiments, the heat exchanger 120 may remain in the same position while the support structure 138 rotates. This may reduce the complexity of the heat exchanger 120 and the support structure 138.

While two carbon capture plates 110 are shown in FIG. 1-1 and FIG. 1-2, it should be understood that more or fewer carbon capture plates 110 may be utilized. For example, a single carbon capture plate 110 may be used. In some examples, 1, 2, 3, 4, 5, 6, 7, 8, 9, 10 or more carbon capture plates 110 may be used. In some examples, the carbon capture plates 110 may be spaced around a circumference of the support structure 138. In some examples, the carbon capture plates 110 may be spaced evenly around the circumference of the support structure. In some examples, two or more carbon capture plates 110 may be located in the same circumferential position, stacked or layered on top of each other. In some embodiments, the angular position of the carbon capture plates 110 may be adjustable, based dynamics of the intake air, the carbon dioxide release, and other factors.

FIG. 2 is a representation of a top-down view of a carbon capture system 200, according to at least one embodiment of the present disclosure. The carbon capture system 200 includes a first carbon capture plate 210-1 and a second carbon capture plate 210-2 secured to a support structure 238. The first carbon capture plate 210-1 is located in a capture position 212 and the second carbon capture plate 210-2 is located in a release position 214.

A first heat exchanger 220-1 is connected to the first carbon capture plate 210-1 and a second heat exchanger 220-2 is connected to the second carbon capture plate 210-2. In the view shown, the second heat exchanger 220-2 is located on the hot side 222. The second heat exchanger 220-2 is connected to the hot fluid line coming from the data center or other heat source, thereby providing heat to the second heat exchanger 220-2 and the connected second carbon capture plate 210-2. The first exchanger 220-1 is not connected to the hot fluid line, and does not provide heat to the first carbon capture plate 210-1.

In some embodiments, when the support structure 238 rotates the second heat carbon capture plate 210-2 from the release position 214 to the capture position 212, the support structure 238 may rotate the connected second heat exchanger 220-2. The second heat exchanger 220-2 may be connected to the hot fluid line with a quick-release connection, which may release from the hot fluid line as the support structure 238 rotates. When the first carbon capture plate 210-1 is moved into the release position 214, the first heat exchanger 220-1 may connect to the hot fluid line, which may provide hot fluid and the connected first carbon capture plate 210-1. The first heat exchanger 220-1 may connect to the hot fluid line with a quick-connect, and thus the first heat exchanger 220-1 may automatically connect to the hot fluid line when moved into the release position 214. Connecting the heat exchangers 220 directly to the carbon capture plates 210 may improve the thermal connection to the carbon capture plates 210, thereby improving the efficiency of carbon dioxide release.

Figure 3:
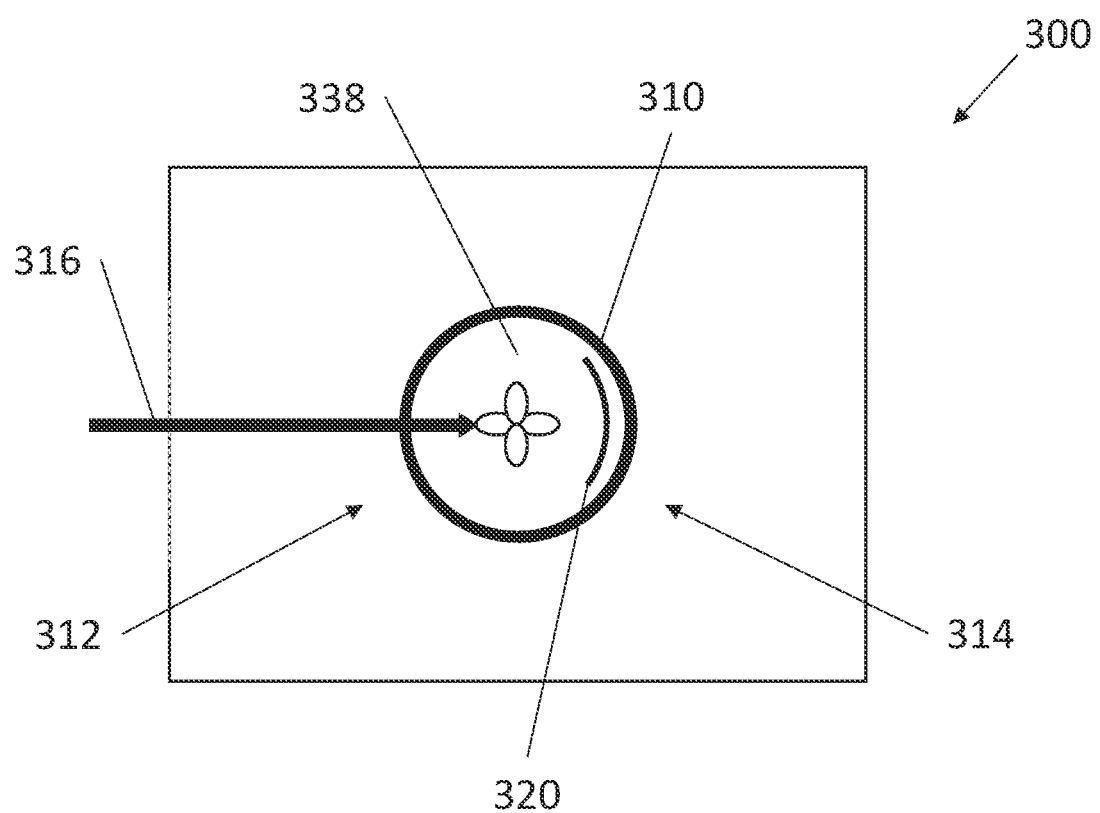
FIG. 3 is a representation of a carbon capture system, according to at least one embodiment of the present disclosure.

FIG. 3 is a representation of a top-down view of a carbon capture system 300, according to at least one embodiment of the present disclosure. The carbon capture system 300 includes a cylindrical carbon capture plate 310 supported by a support structure 338. A heat exchanger 320 is located on a release side 314 of the carbon capture system 300. As the support structure 338 rotates the cylindrical carbon capture plate 310, different portions of the carbon capture plate 310 are exposed to the heat exchanger 320 at the release position 314 and the first flow 316 of intake air at the capture position 312.

In some embodiments, the support structure 338 and the connected cylindrical carbon capture plate 310 may be continuously rotated. In some embodiments, the support structure 338 and the connected cylindrical carbon capture plate 310 are rotated at discrete intervals. For example, the support structure 338 may be rotated by a particular rotation amount based on one or more rotation criteria. The rotation amount may be any value, including 15°, 30°, 45°, 60°, 75°, 90°, 105°, 120°, 135°, 150°, 165°, 180°, or any value therebetween. The rotation criteria may be any criteria, such as a duration, a carbon capture amount, a carbon release amount, any other criteria, and combinations thereof. Utilizing a cylindrical carbon capture plate 310 may allow for a continuous capture and release of carbon dioxide, with little to no downtime caused by changing positions of the carbon capture plates.

Figure 4:
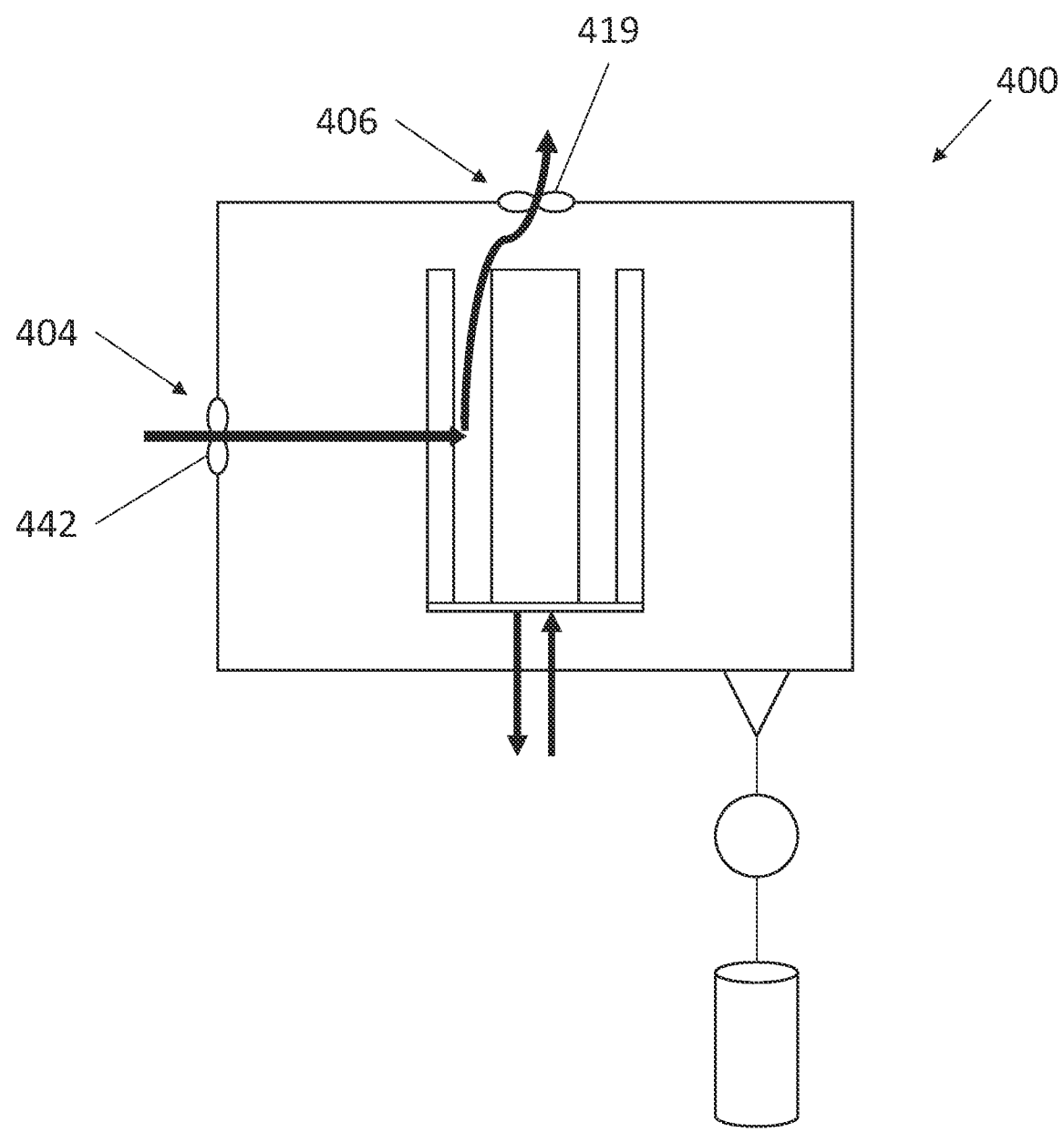
FIG. 4 is a representation of a carbon capture system, according to at least one embodiment of the present disclosure.

FIG. 4 is a representation of a side view of a carbon capture system 400, according to at least one embodiment of the present disclosure. The carbon capture system 400 includes an exhaust fan 419 at an outlet 406 that applies a negative pressure to the interior of the carbon capture system 400. The exhaust fan 419 may be considered a pull fan, because it pulls air from the interior of the carbon capture system 400. The carbon capture system 400 further includes an inlet fan 442 at an inlet 404. The inlet fan 442 may blow air into the interior of the carbon capture system 400. The inlet fan 442 may be a push fan, because it pushes air into the interior of the carbon capture system 400. Providing both a pull fan and the push fan may help to reduce the overall power consumption of the carbon capture system 400 by managing the pressure in the interior of the carbon capture system 400.

Figure 5:
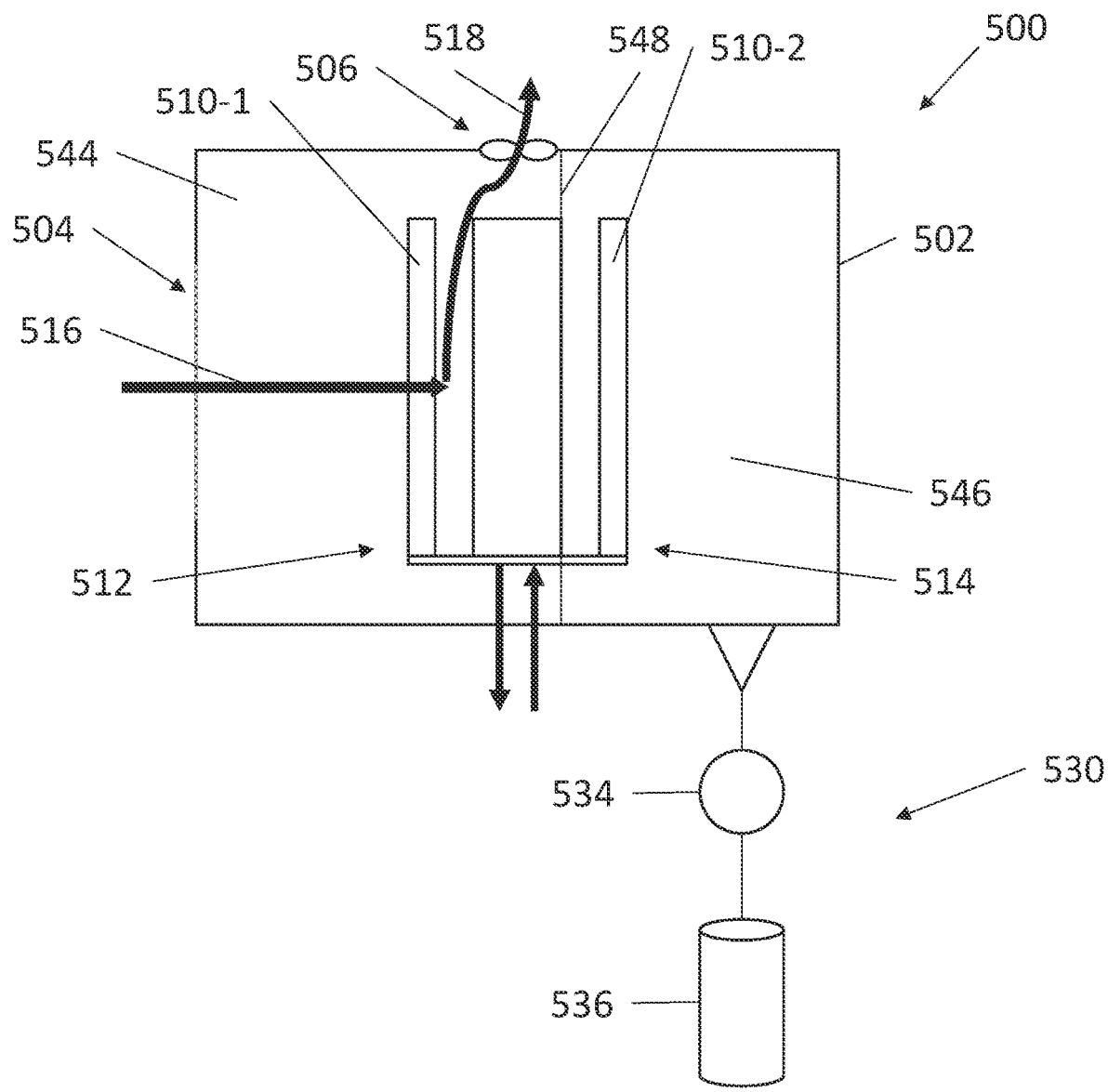
FIG. 5 is a representation of a carbon capture system, according to at least one embodiment of the present disclosure.

FIG. 5 is a representation of a carbon capture system 500 including a separation between a capture chamber 544 and a release chamber 546, according to at least one embodiment of the present disclosure. The first flow 516 of intake air flows into the interior of the housing 502 into the capture chamber 544 and across the first carbon capture plate 510-1 in the capture position 512. The depleted second flow 518 of exhaust air travels out of the housing 502 through the outlet 506.

The capture chamber 544 is separated from the release chamber 546 with a divider 548. The divider 548 may prevent air from passing between the capture chamber 544 and the release chamber 546. In this manner, the first flow 516 of intake air and the second flow 518 of exhaust air flow from the inlet 504 to the outlet 506 without any portion flowing into the release chamber 546.

Furthermore, based on the divider 548, carbon dioxide released from the second carbon capture plate 510-2 in the release position 514 may remain in the release chamber 546. Because the release chamber 546 is separate from the capture chamber 512, the released carbon dioxide will not mix with the second flow 518 of exhaust air, and be exhausted out of the outlet. This may help to increase the effectiveness of the carbon capture system 500.

In some embodiments, the release chamber 546 is maintained in a vacuum or partial vacuum. Carbon dioxide released from the second carbon capture plate 510-2 may increase the pressure in the release chamber 546. When the release chamber 546 reaches a minimum pressure, a carbon collection system 530 may collect the carbon dioxide. For example, a compressor 534 may compress the carbon dioxide for storage in a carbon storage tank 536. In some embodiments, the release chamber 546 includes multiple chambers. Carbon dioxide may be released from the second carbon capture plate 510-2 into a first chamber. The second chamber may be emptied by compressing the collected carbon dioxide. To recycle the vacuum from the second chamber, or to reduce the starting pressure for the compressor 534, the first chamber may be opened to the second chamber, thereby equalizing the pressures at a lower pressure than was present in the first chamber. This may help to reduce electric costs for compressing the collected carbon dioxide.

Figure 6:
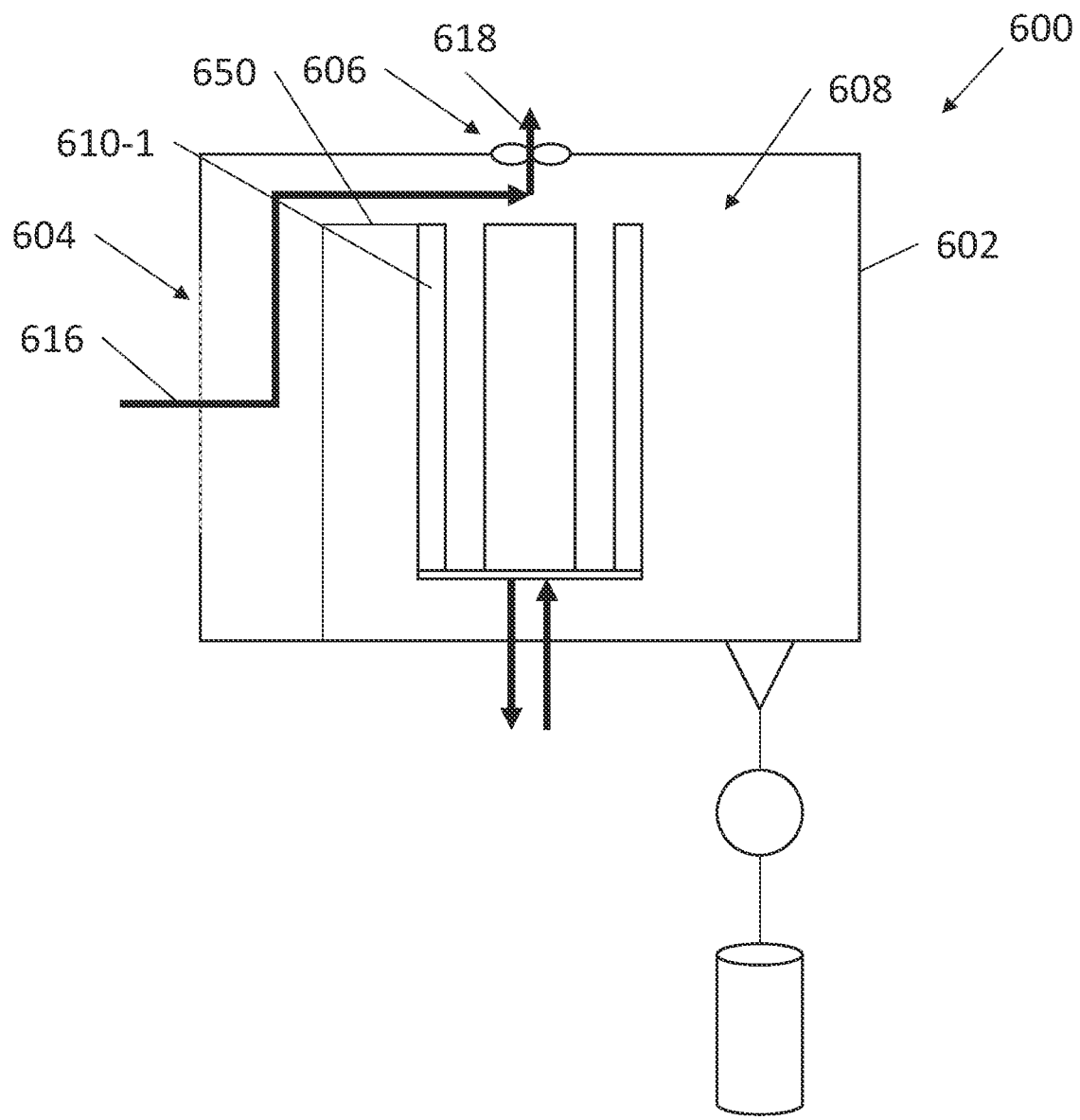
FIG. 6 is a representation of a carbon capture system, according to at least one embodiment of the present disclosure.

FIG. 6 is a representation of a carbon capture system 600 including a bypass 650, according to at least one embodiment of the present disclosure. The bypass 650 may route a first flow 616 of intake air directly from an intake 604 to an outlet 604, where it exits the housing 602 as a second flow 618 of exhaust air. The intake air may not be changed, or may have the same concentration of carbon dioxide, as the exhaust air.

The bypass 650 is a physical barrier that blocks the first flow 616 from flowing through or otherwise engaging the first carbon capture plate 610-1 or any other portion of a carbon capture module 608. The bypass 650 is selectively implementable. Put another way, the bypass 650 may be engaged or put into place based on one or more bypass criteria. In some embodiments, the bypass 650 may be put into place when the carbon capture module 608 is rotating, or changing positions of the first carbon capture plate 610-1. This may help to reduce interference of the first flow with the carbon capture module 608 while changing positions.

Figure 7:
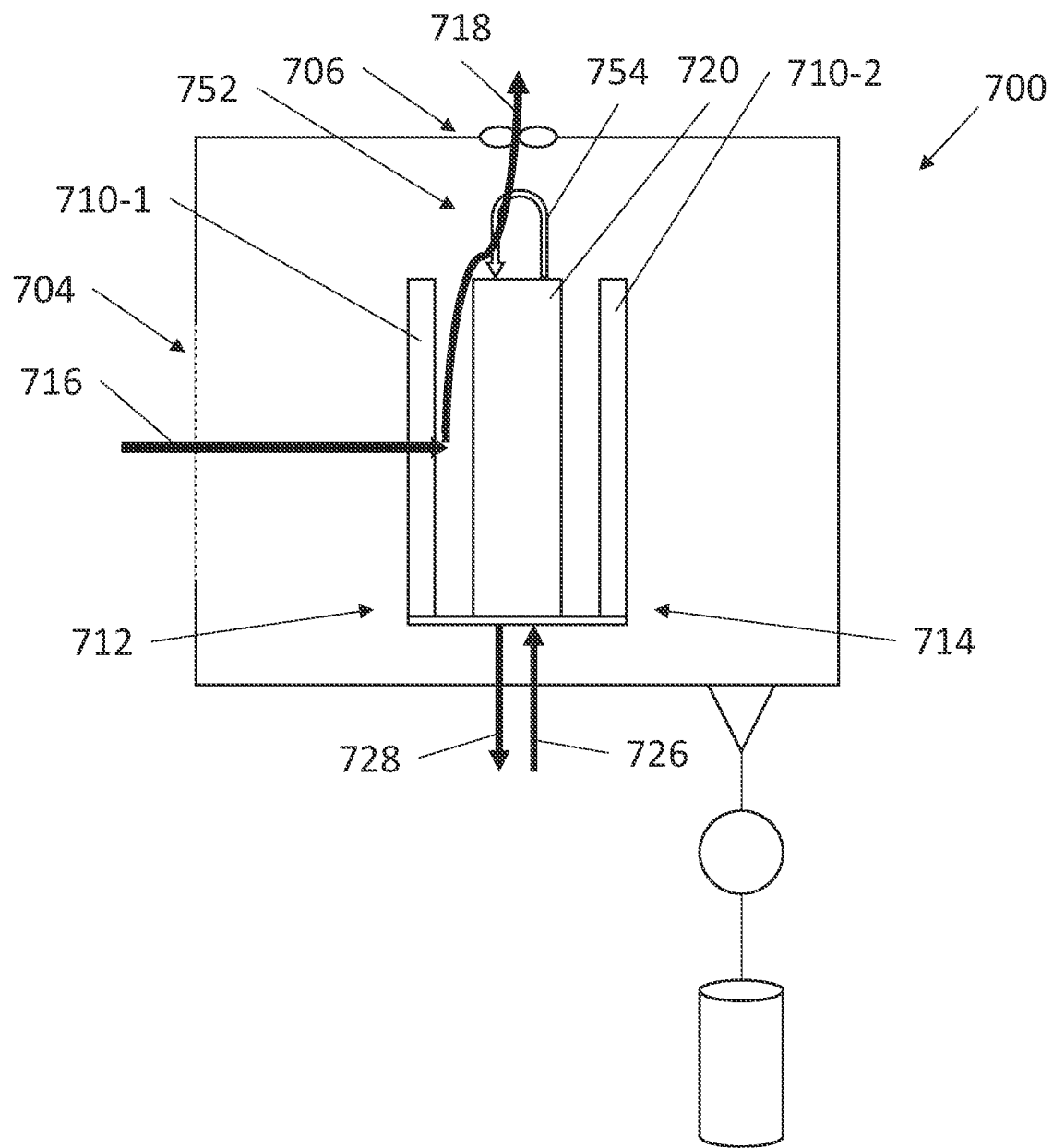
FIG. 7 is a representation of a carbon capture system, according to at least one embodiment of the present disclosure.

FIG. 7 is a representation of a carbon capture system 700 including a cooling circuit 752, according to at least one embodiment of the present disclosure. During operation of the carbon capture system 700, fluid entering a heat exchanger 720 from a hot fluid line 726 transfers heat to a second carbon capture plate 710-2 in a release position 714 to release captured carbon dioxide in the second carbon capture plate 710-2. This may cool (e.g., reduce the temperature of) the fluid from the hot fluid line 726 in the heat exchanger 720.

In some embodiments, the temperature of the fluid in the cold fluid line 728, while colder than the temperature of the fluid in the hot fluid line 726, is too high for the cooling system. To further reduce the temperature of the fluid, the fluid is passed through the cooling circuit 752. The cooling circuit 752 further cools the fluid after it leaves the heat exchanger 720 until the temperature is below the maximum temperature for the cooling system.

A first flow 716 of intake air enters the carbon capture system 700 from the intake 704. After the first flow 716 of intake air passes over the first carbon capture plate 710-1 in the capture position 712, a second flow 718 of exhaust air passes out of the carbon capture system 700. In the embodiment shown, the second flow 718 of exhaust air is passed over a cooling coil 754 of the fluid. The cooling coil 754 receives the fluid provided to the heat exchanger 720 from the hot fluid line 726. The temperature of the exhaust air 718 is lower than the temperature of the fluid in the cooling coil 754. In this manner, as the second flow 718 of exhaust air passes over the cooling coil 754, the temperature of the cooling coil 754 is reduced. The fluid in the cooling coil 754 then exits the carbon capture system 700 though the cold fluid line 728. In this manner, the carbon capture system 700 may cool the fluid used in the cooling system to the operating temperature. This may help to reduce or prevent the use of a secondary cooling system to further cool the cooling system's fluid.

Figure 8:
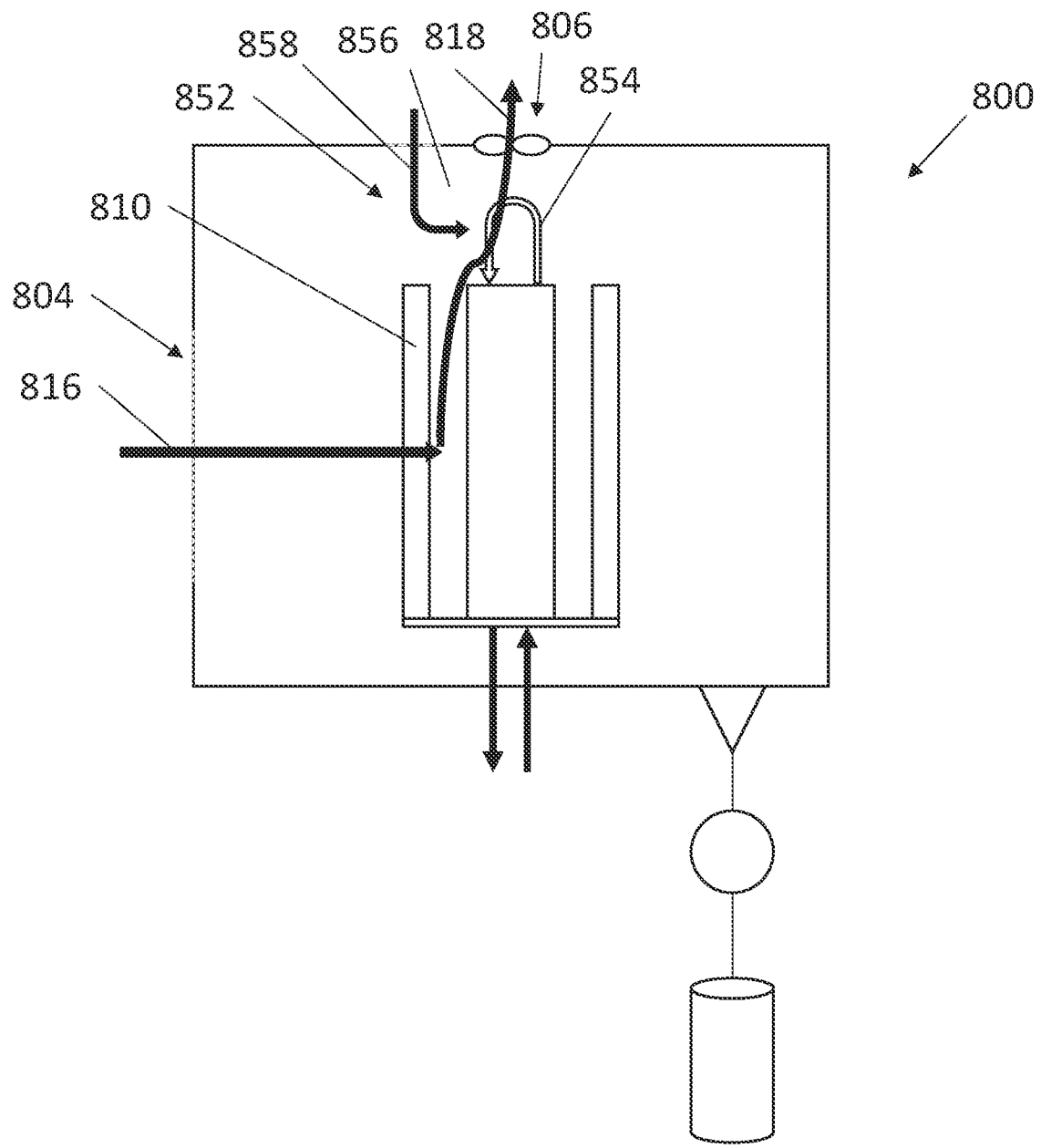
FIG. 8 is a representation of a carbon capture system, according to at least one embodiment of the present disclosure.

FIG. 8 is a representation of a carbon capture system 800 including a cooling circuit 852, according to at least one embodiment of the present disclosure. The cooling circuit 852 includes a mixing chamber 856. After a first flow 816 of intake air passes into the carbon capture system 800 through the intake 804 and over the carbon capture plate 810, some or all of the carbon dioxide in the intake air is absorbed by the first carbon capture plate. Carbon dioxide has a higher heat capacity than many of the other components of ambient air, and removing the carbon dioxide from air may reduce the total heat absorbing capacity of the second flow 818 of exhaust air that passes through the cooling circuit.

To increase the heat capacity of the second flow 818 of exhaust air, ambient air 858 is introduced into the mixing chamber 856. The ambient air 858 mixes with the second flow 818 of exhaust air before or as it passes over the cooling coil 854. In some embodiments, the ambient air 858 includes a higher concentration of carbon dioxide than the second flow 818 of exhaust air, which may increase the heat capacity of the second flow 818 of exhaust air. This mixed exhaust air may help to reduce the temperature of the fluid in the cooling coil 854 further than the second flow 818 of exhaust air alone.

Figure 9:
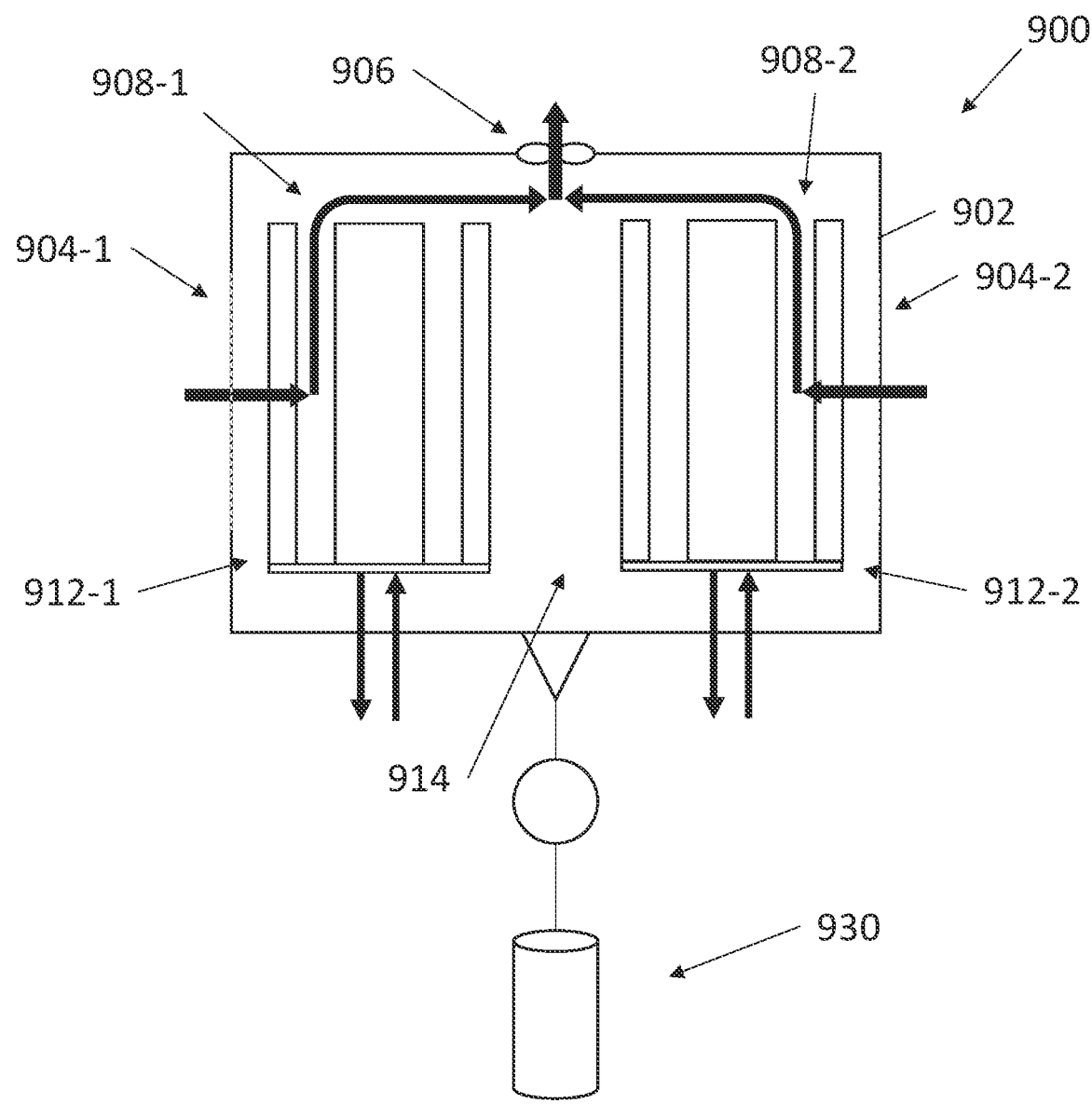
FIG. 9 is a representation of a carbon capture system, according to at least one embodiment of the present disclosure.

FIG. 9 is a representation of a carbon capture system 900 including two carbon capture modules (collectively 908), according to at least one embodiment of the present disclosure. The carbon capture modules 908 are both located in the interior of the housing 902. In the embodiment shown, each of the carbon capture modules 908 operate as discussed above with respect to FIG. 1. The housing 902 includes a first inlet 904-1 and a second inlet 904-2. Intake air flows in through the inlets 904 to the carbon capture modules 908 and out of an outlet 906. The carbon capture modules 908 shown are oriented so that a first capture position 912-1 for the first carbon capture module 908 and a second capture position 912-2 for the second carbon capture module 908 are oriented toward the outside of the housing 902. A release position 914 is located in the center of the housing 902. This may orient the carbon capture modules 908 to release the captured carbon dioxide in a common location to improve the ease of collection for a carbon collection system 930. Including two carbon capture modules 908 may increase the total amount of carbon captured by the carbon capture system 930. Furthermore, including two carbon capture modules 908 may increase the redundancy of the carbon capture system 900, thereby increasing the reliability and operability of the carbon capture system 900.

Figure 10:
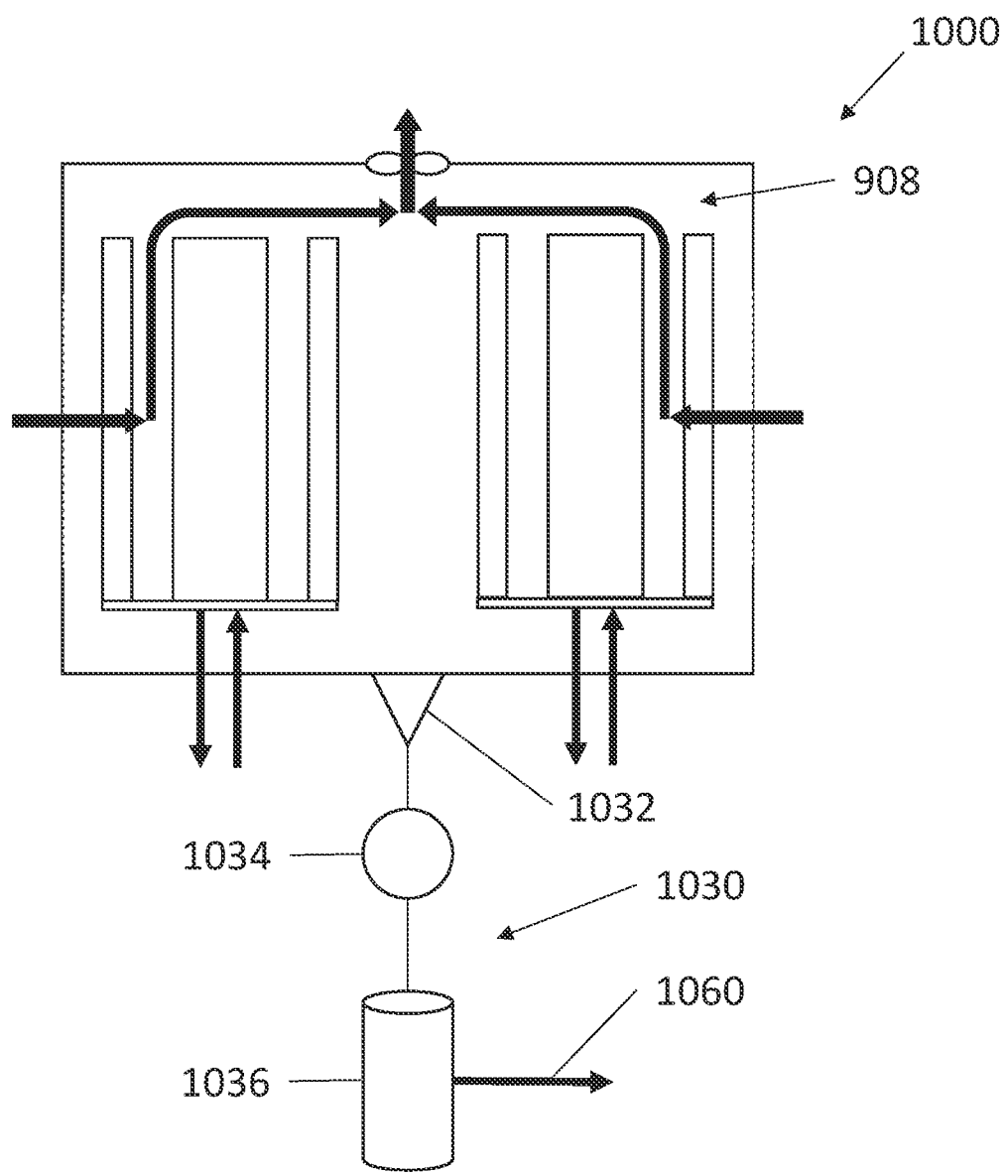
FIG. 10 is a representation of a carbon capture system, according to at least one embodiment of the present disclosure.

FIG. 10 is a representation of a carbon capture system 1000 having a carbon capture system 1030 with a re-use circuit 1060, according to at least one embodiment of the present disclosure. Carbon dioxide released from one or more carbon capture modules 908 is collected at the carbon capture system 1030. In the embodiment shown, released carbon dioxide is collected at a collection pan 1032. The collected carbon dioxide is compressed at a compressor 1034 and stored in a carbon storage tank 1036.

The carbon capture system 1030 has a connected re-use circuit 1060. For example, in the embodiment shown, the re-use circuit 1060 branches off of the carbon storage tank 1036. In some embodiments, the re-use circuit 1060 directs the carbon dioxide to any location or use. For example, the re-use circuit 1060 may direct the carbon dioxide to one or more HVAC systems for use as a refrigerant or other HVAC fluid. In some examples, utilizing the collected carbon dioxide as a refrigerant may allow the operator to reduce the material costs for cooling a data center. In some examples, the collected carbon dioxide may be cool to super critical carbon dioxide. Super critical carbon dioxide may be used to help cool high performance computing devices that generate large amounts of heat, or are configured to operate at very cold temperatures. In some examples, the re-use circuit 1060 may direct the carbon dioxide to an industrial application, such as an ingredient or material in an industrial process. In some examples, the re-use circuit 1060 may direct the carbon dioxide to a storage and shipping location, where the collected carbon dioxide may be stored and shipped to a permanent storage location and/or sold for other industrial uses.

Figure 11:
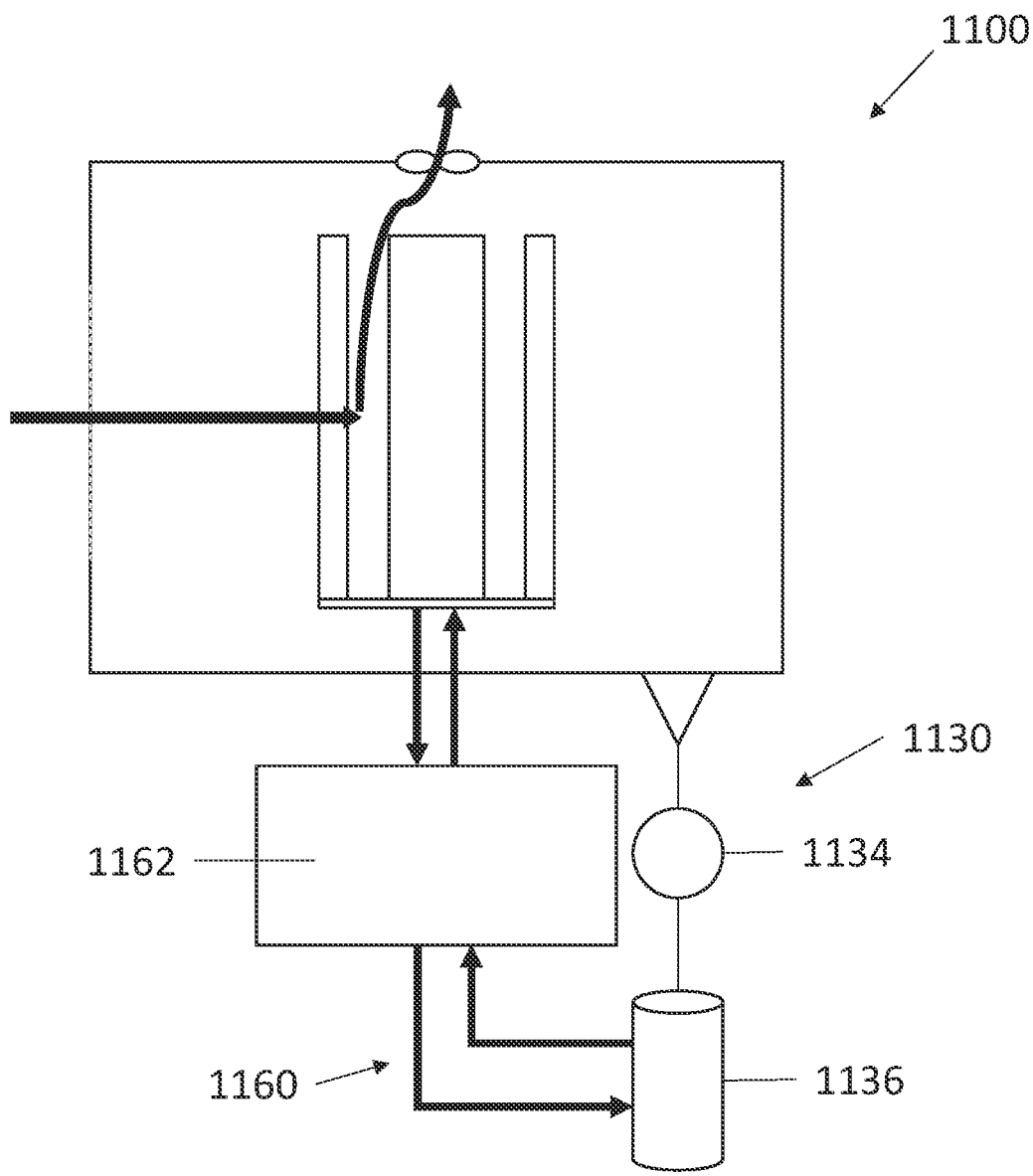
FIG. 11 is a representation of a carbon capture system, according to at least one embodiment of the present disclosure.

FIG. 11 is a representation of a carbon capture system 1100 having a carbon capture system 1130 with a re-use circuit 1160, according to at least one embodiment of the present disclosure. In some embodiments, carbon dioxide collected at a carbon storage tank 1136 is routed for use as a coolant or other liquid in a cooling system 1162 of a data center. For example, the carbon dioxide may be used to cool the working fluid of the cooling system 1162 so that it absorbs more heat from the processors of the data center. In some examples, the carbon dioxide may be used as a working fluid in the cooling system 1162. This may help to reduce material costs by utilizing collected carbon dioxide.

The carbon dioxide is routed into the cooling system 1162 and back to the carbon storage tank 1136. In some embodiments, the carbon dioxide is routed directly back to the carbon storage tank 1136. In some embodiments, the temperature and pressure of the carbon dioxide has increased, and the carbon dioxide is re-compressed at the compressor 1134 before being redirected back into the carbon storage tank 1136.

Figure 12:
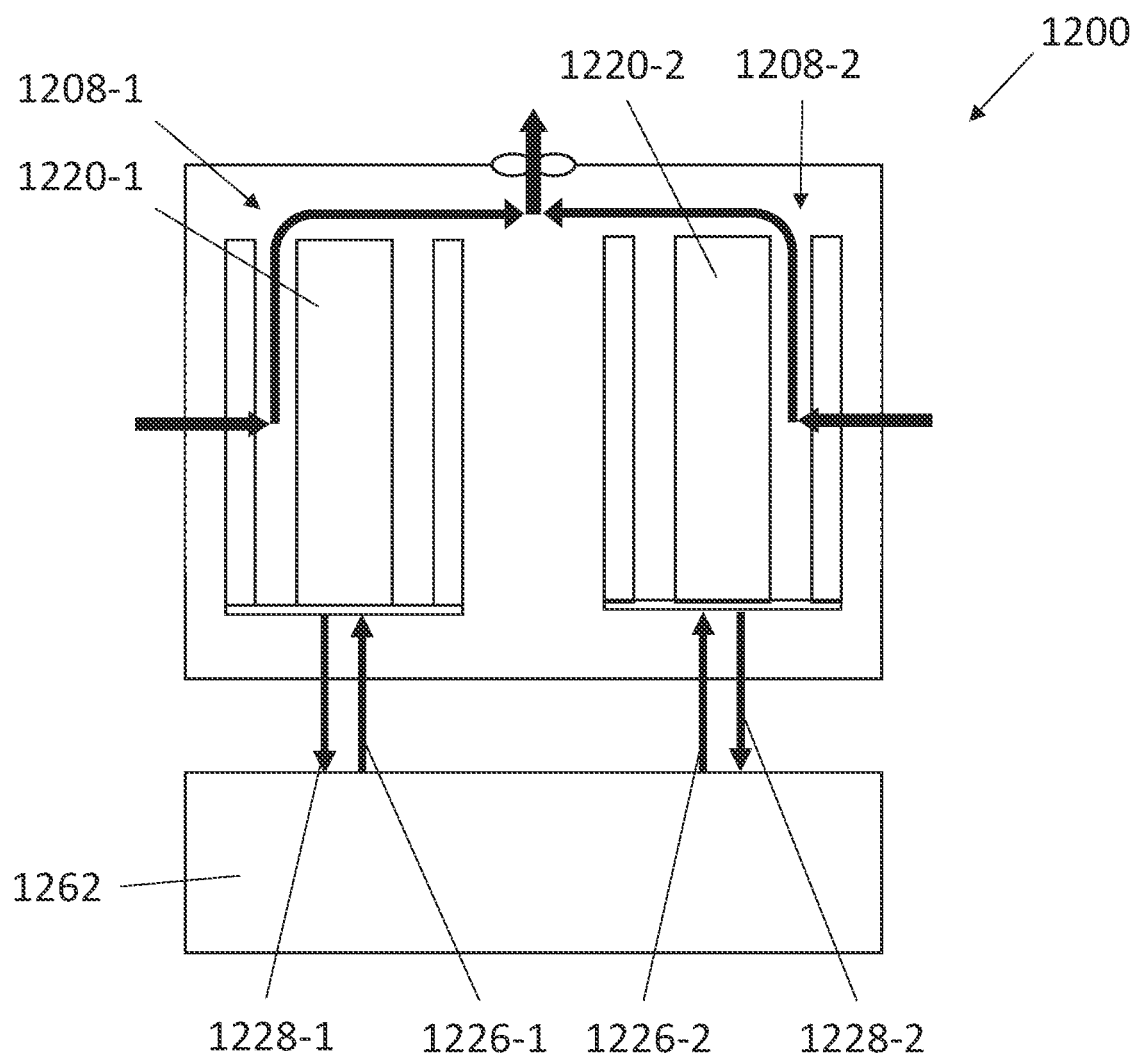
FIG. 12 is a representation of a carbon capture system, according to at least one embodiment of the present disclosure.

FIG. 12 is a representation of a carbon capture system 1200 having a single cooling system 1262 providing hot fluid to the heat exchangers (collectively 1220) of multiple carbon capture modules 1208, according to at least one embodiment of the present disclosure. The carbon capture system 1200 includes a first carbon capture module 1208-1 and a second carbon capture module 1208-2. The first carbon capture module 1208-1 has a first heat exchanger 1220-1 and the second carbon capture module 1208-2 has a second heat exchanger 1220-2.

The cooling system 1262 sends working fluid or cooling fluid that has been heated up in a data center or other operation to the heat exchangers 1220 using hot fluid line (collectively 1226) and cooled fluid is returned to the cooling system 1262 using cold fluid lines (collectively 1228). In the embodiment shown, each carbon capture module 1208 has separate hot fluid lines 1226 and cold fluid lines 1228. The first heat exchanger 1220-1 receives a first hot fluid line 1226-1 from the cooling system 1262 and the second heat exchangers 1220-2 receives a second hot fluid line 1226-2 from the cooling system 1262. The first heat exchanger 1220-1 sends cooled fluid to the cooling system 1262 in a first cold fluid line 1228-1 and the second heat exchanger 1220-2 sends cooled fluid to the cooling system 1262 in a second cold fluid line 1228-2. Providing fluid to each heat exchanger 1220 in separate hot fluid lines 1226 and cold fluid lines 1228 may allow for precise regulation of the flow of the working fluid between the cooling system 1262 and the heat exchangers 1220.

Figure 13:
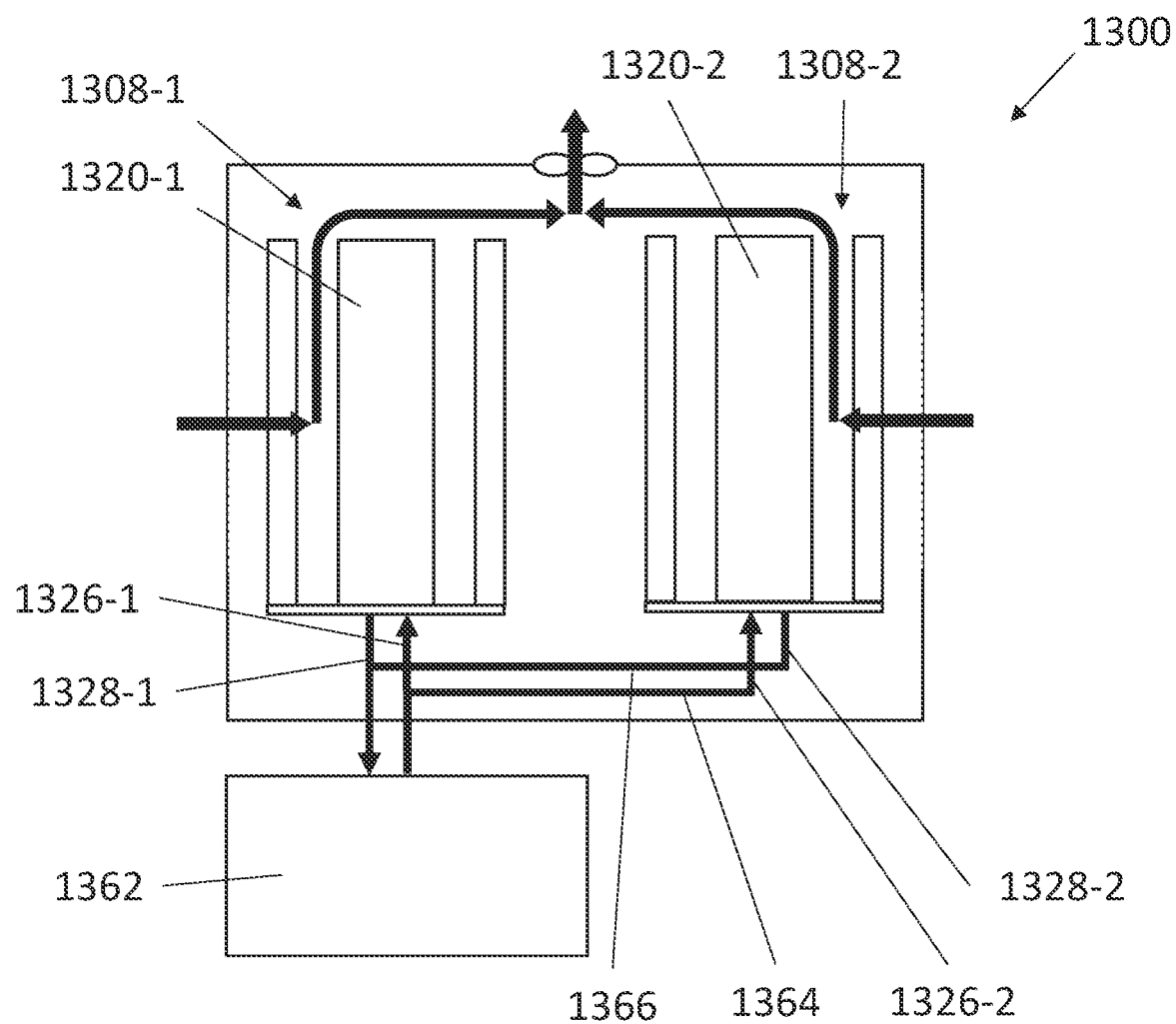
FIG. 13 is a representation of a carbon capture system, according to at least one embodiment of the present disclosure.

FIG. 13 is a representation of a carbon capture system 1300 having a single cooling system 1362 providing hot fluid to the heat exchangers (collectively 1320) of multiple carbon capture modules 1308, according to at least one embodiment of the present disclosure. The cooling system 1362 provides hot fluid to multiple heat exchangers 1320 from a single hot fluid bus 1364. Cold fluid is returned to the cooling system 1362 using a single cold fluid bus 1366. Using a single hot fluid bus 1364 and a single cold fluid bus 1366 may help to simplify the plumbing of the carbon capture system and allow the heat exchangers 1320 to share hot working fluid.

A first hot fluid intake 1326-1 branches off of the hot fluid bus 1364 and extends into a first heat exchanger 1320-1 of the first carbon capture module 1308-1. A second hot fluid intake 1326-2 branches off of the hot fluid bus 1364 and extends into a second heat exchanger 1320-2 of the second carbon capture module 1308-2. Cold return fluid from the first heat exchanger 1320-1 is transferred to the cold fluid bus 1366 in a first cold fluid outlet 1328-1 and cold return fluid from the second heat exchanger 1320-2 is transferred to the cold fluid buss 1366 in a second cold fluid outlet 1328-2.

Figure 14:
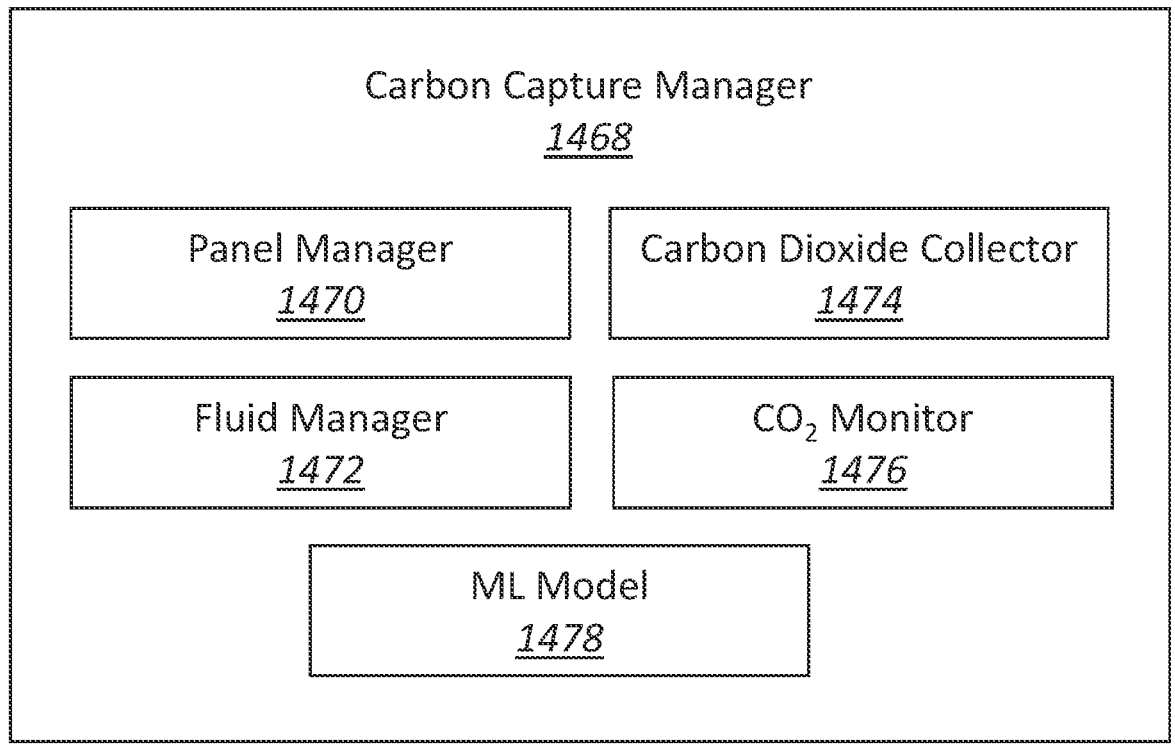
FIG. 14 is a representation of a carbon capture manager, according to at least one embodiment of the present disclosure.

FIG. 14 is a representation of a carbon capture manager 1468, according to at least one embodiment of the present disclosure. The carbon capture manager 1468 manages the operation of one or more carbon capture systems, such as the carbon capture systems discussed in further detail herein. The carbon capture manager 1468 includes a panel manager 1470 which controls operation of the carbon capture plates. In some embodiments, the panel manager 1470 controls the position for the panels. For example, the panel manager 1470 may cause the panels to move between the capture position and the release position. In some embodiments, the panel manager 1470 may rotate the support structure supporting the carbon capture plates.

A fluid manager 1472 manages the inflow of hot fluid from the cooling system into the heat exchangers and the outflow of cold fluid out of the heat exchangers. In some embodiments, the fluid manager 1472 controls the temperature of the heat exchangers. For example, the fluid manager 1472 may monitor the temperature on the hot side of the heat exchanger. If the temperature is too low, the fluid manager may flow more hot fluid through the heat exchanger. If the temperature is too high, the fluid manager may flow less hot fluid through the heat exchanger. In some embodiments, to control the temperature of the heat exchanger, the fluid manager 1472 controls one or more valves, gates, flow regulators, or other flow management devices.

The carbon capture manager 1468 includes a carbon dioxide collector 1474. The carbon dioxide collector 1474 manages the collection of carbon dioxide released from the carbon capture plates. In some embodiments, the carbon dioxide collector 1474 collects released carbon dioxide based on the one or more factors. For example, the carbon dioxide collector 1474 may collect the carbon dioxide when a concentration of carbon dioxide in a release chamber is above a threshold concentration. In some examples, the carbon dioxide collector 1474 may collect the carbon dioxide when a pressure in the release chamber is above a threshold pressure.

The carbon capture manager 1468 includes a carbon dioxide ($CO_2$) monitor 1476. In some embodiments, the carbon dioxide monitor 1476 monitors the concentration of carbon dioxide at various locations within the carbon capture monitor. For example, the carbon dioxide monitor 1476 may include a sensor on the carbon capture plates that senses the saturation or carbon dioxide content on each of the carbon capture plates. In some examples, the carbon dioxide monitor 1476 may include a sensor at the inlet to monitor the carbon dioxide concentration of the inlet air. In some examples, the carbon dioxide monitor 1476 may include a sensor at the outlet to monitor the carbon dioxide concentration of the outlet air. In some examples, the carbon dioxide monitor 1476 may include a sensor in the release chamber to monitor the carbon dioxide concentration of the release chamber.

In accordance with at least one embodiment of the present disclosure, elements of the carbon capture manager 1468 utilize the sensed carbon dioxide concentrations from the carbon dioxide collector 1474 to change one or more parameters of the carbon capture system. For example, the panel manager 1470 may use the sensed carbon dioxide concentrations of the panels to determine when to rotate the carbon capture plates between the capture position and the release position. In some examples, the carbon dioxide collector 1474 may use the sensed carbon dioxide concentrations in the release chamber to determine when to collect carbon dioxide.

The carbon capture manager 1468 further includes a machine learning model 1478, according to at least one embodiment of the present disclosure. The machine learning model 1478 is trained to patterns between operating parameters of a carbon capture system. Using the patterns identified by the machine learning model 1478, the carbon capture manager 1468 adjusts one or more operating parameter to improve performance of the carbon capture system. In some embodiments, the machine learning model 1478 receives input regarding various parameters. For example, the machine learning model 1478 may receive input regarding ambient air temperature, ambient air humidity, computing load of a data center, coolant temperature, capture time, release time, pre-capture ambient air carbon dioxide concentration, post capture ambient air carbon dioxide concentration, ambient air velocity, ambient air pressure drop, fan speed, number of fans operating, status of auxiliary heaters, release chamber vacuum pressure, mass of carbon dioxide captured per cycle, mass of water captured per cycle, power use per component, any other parameter, and combinations thereof. A machine learning model 1478 may help to reduce the cost of carbon dioxide capture.

Figure 15:
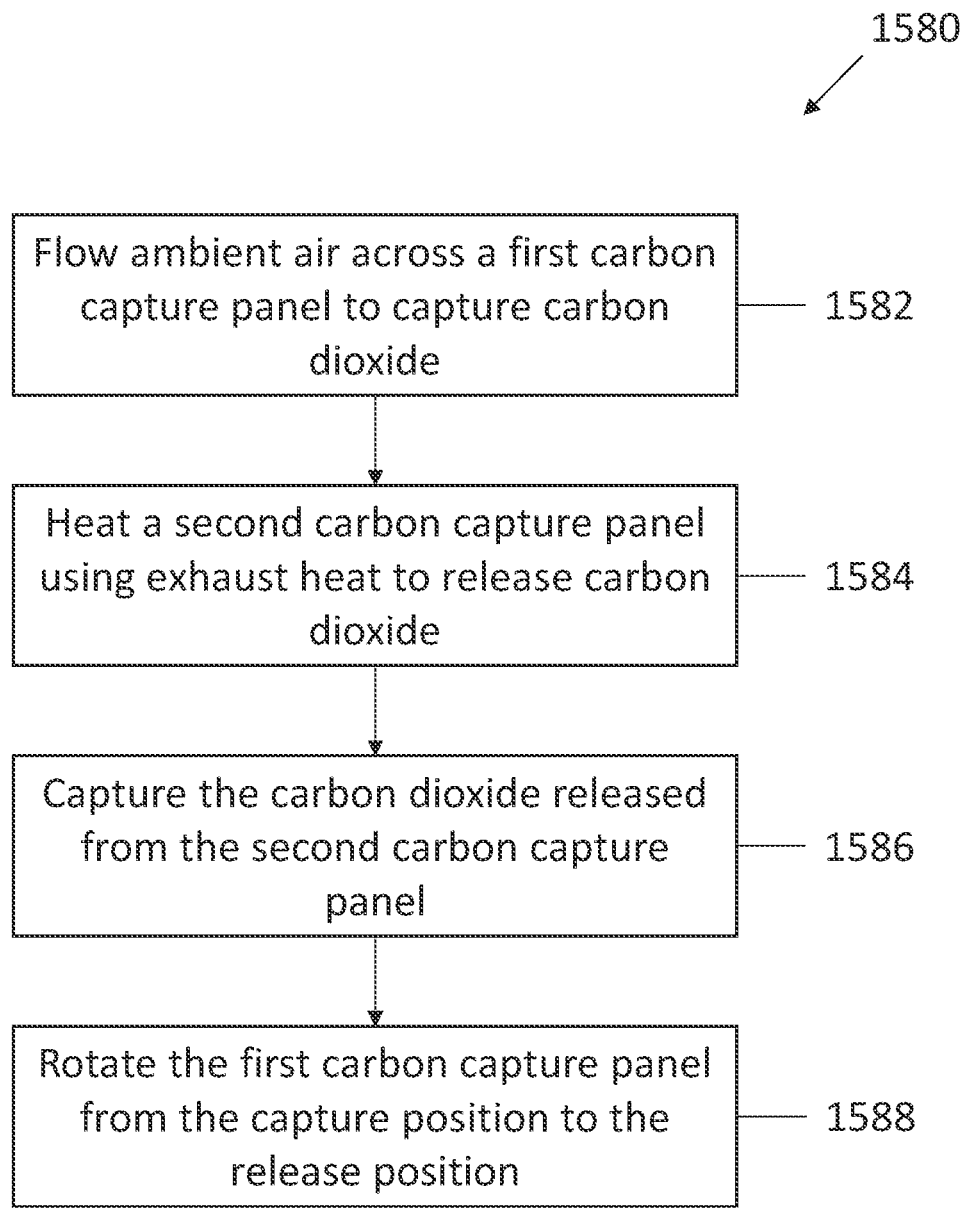
FIG. 15 is a flowchart of a method for carbon capture, according to at least one embodiment of the present disclosure.

FIG. 15 is a flowchart of a method 1580 for carbon capture, according to at least one embodiment of the present disclosure. The method 1580 includes flowing ambient air across from an inlet in a housing, across a first carbon capture plate located at a capture position in the housing, and out an outlet of the housing at 1582. The capture panel absorbs carbon dioxide from the ambient air. A second carbon capture plate is heated using exhaust heat from a data center cooling system at 1584. The second carbon capture plate is located at a release position in the housing an releases carbon dioxide from the release panel into a release chamber. The released carbon dioxide is captured in the release chamber with a carbon storage mechanism at 1586. The first carbon capture plate is rotated from the capture position to the release position at 5188. The second carbon capture plate is rotated from the release position to the capture position.

In some embodiments, flowing the ambient air includes flowing the ambient air at a temperature of less than 35° C. In some embodiments, rotating the first carbon capture plate and the second carbon capture plate includes rotating them 180°. In some embodiments, the capturing the carbon dioxide includes compressing the carbon dioxide and storing the carbon dioxide in a carbon storage tank. In some embodiments, the method 1580 further includes training a machine learning model based on input from the carbon capture system.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A carbon capture system, comprising:
   a plate support rotatable between a capture position and a release position;
   a carbon capture media connected to the plate support;
   a heat exchanger, a hot side of the heat exchanger thermally connected to the plate support at the release position, and wherein the carbon capture media is configured to move around the heat exchanger from the capture position to the release position; and
   a carbon collection system positioned to collect carbon released at the release position.

2. The carbon capture system of claim 1, wherein the heat exchanger receives heat from a data center.

3. The carbon capture system of claim 1, wherein the heat exchanger includes a heat source.

4. The carbon capture system of claim 1, wherein the carbon collection system includes a carbon dioxide separator.

5. The carbon capture system of claim 1, wherein the carbon capture system includes a compressor and carbon storage tank.

6. The carbon capture system of claim 1, further comprising an outlet fan, the outlet fan being rotatable to draw air across the carbon capture media in the capture position.

7. The carbon capture system of claim 6, further comprising an inlet fan, the inlet fan being rotatable to push air across the carbon capture media in the capture position toward the outlet fan.

8. The carbon capture system of claim 1, wherein the capture position is located in a capture chamber and the release position is located in a release chamber.

9. The carbon capture system of claim 1, further comprising a ventilation bypass past the capture position.

10. The carbon capture system of claim 9, further comprising a mixing chamber at the bypass, the heat exchanger extending into the mixing chamber.

11. A carbon capture system, comprising:
    a carbon collection chamber including:
    a carbon capture module, including:
       a capture position;
       a release position;
       a carbon capture media; and
       a support structure supporting the carbon capture media, the support structure rotatable to move the carbon capture media between the capture position and the release position; and
    a heat exchanger including a hot side and a cold side, the hot side being proximate to the release position, and wherein the carbon capture media is configured to move around the heat exchanger from the capture position to the release position;
    a hot fluid line connected to a cooling system for a data center, the hot fluid line providing hot fluid to the hot side of the heat exchanger; and
    a cold fluid line connected to the cold side of the heat exchanger and returning cold fluid to the cooling system.

12. The carbon capture system of claim 11, wherein the hot side of the heat exchanger includes a quick-release connection to the hot fluid line.

13. The carbon capture system of claim 11, wherein the cooling system is a liquid immersion cooling system.

14. The carbon capture system of claim 11, further comprising a carbon storage mechanism in a release chamber at the release position.

15. The carbon capture system of claim 14, wherein the carbon storage mechanism includes a re-use circuit between a carbon storage tank and one or more of the cooling system or an HVAC system.

16. A method for carbon capture, comprising:
    flowing ambient air from an inlet in a housing of a carbon capture system, across a carbon capture media located at a capture position in the housing, and out an outlet of the housing, the carbon capture media absorbing carbon dioxide from the ambient air;
    capturing the carbon dioxide in a release chamber with a carbon storage mechanism; and
    rotating the carbon capture media from the capture position to the release position around a heat exchanger.

17. The method of claim 16, wherein flowing the ambient air includes flowing the ambient air at a temperature of less than 35° C.

18. The method of claim 16, wherein rotating the carbon capture media includes rotating 180°.

19. The method of claim 16, wherein capturing the carbon dioxide includes compressing the carbon dioxide and storing the carbon dioxide in a carbon storage tank.

20. The method of claim 16, further comprising training a machine learning model based on input from the carbon capture system.

* * * * *